US012134372B2

(12) United States Patent
Wang

(10) Patent No.: US 12,134,372 B2
(45) Date of Patent: Nov. 5, 2024

(54) LIFTABLE LUGGAGE CARRIER ON CAR ROOF

(71) Applicant: Ningbo Tuoluzhe Auto Accessories Co., Ltd., Ningbo (CN)

(72) Inventor: Baorong Wang, Ningbo (CN)

(73) Assignee: Ningbo Tuoluzhe Auto Accessories Co., Ltd., Ningbo (CN)

( * ) Notice: Subject to any disclaimer, the term of this patent is extended or adjusted under 35 U.S.C. 154(b) by 125 days.

(21) Appl. No.: 17/973,570

(22) Filed: Oct. 26, 2022

(65) Prior Publication Data
US 2023/0050631 A1 Feb. 16, 2023

(30) Foreign Application Priority Data

Apr. 8, 2022 (CN) .......................... 202210370179.4

(51) Int. Cl.
*B60R 9/042* (2006.01)
*B60R 9/045* (2006.01)

(52) U.S. Cl.
CPC .............. *B60R 9/042* (2013.01); *B60R 9/045* (2013.01)

(58) Field of Classification Search
CPC ................................ B60R 9/042; B60R 9/045
USPC ........................................................ 224/310
See application file for complete search history.

(56) References Cited

U.S. PATENT DOCUMENTS

| 3,531,006 | A | * | 9/1970 | Farchmin | B60R 9/042 |
| | | | | | 414/462 |
| 3,608,759 | A | * | 9/1971 | Spurgeon | B60R 9/0426 |
| | | | | | 414/542 |
| 4,446,998 | A | * | 5/1984 | Taig | B60R 9/042 |
| | | | | | 224/310 |
| 4,826,387 | A | * | 5/1989 | Audet | B60R 9/0423 |
| | | | | | 224/310 |
| 5,346,355 | A | * | 9/1994 | Riemer | B60R 9/042 |
| | | | | | 224/310 |
| 5,360,150 | A | * | 11/1994 | Praz | B60R 9/042 |
| | | | | | 224/310 |
| 5,398,778 | A | * | 3/1995 | Sexton | B60R 9/0423 |
| | | | | | 224/310 |
| 5,421,495 | A | * | 6/1995 | Bubik | B60R 9/042 |
| | | | | | 224/310 |
| 5,544,796 | A | * | 8/1996 | Dubach | B60R 9/042 |
| | | | | | 224/310 |
| 5,649,655 | A | * | 7/1997 | Kerner | B60R 9/042 |
| | | | | | 224/310 |
| 5,827,036 | A | * | 10/1998 | Steffes | B60R 9/0426 |
| | | | | | 224/310 |

(Continued)

*Primary Examiner* — Peter N Helvey
(74) *Attorney, Agent, or Firm* — Hemisphere Law, PLLC; Zhigang Ma

(57) ABSTRACT

The present disclosure relates to a liftable luggage carrier on a car roof. The liftable luggage carrier on a car roof includes: sliding frames, at least two sliding frames are arranged, the sliding frames are fixed on the car roof, and limiting baffles and several locking holes are provided on the sliding frames; sliding seats are slidably installed on the sliding frames, one or two sliding seats are arranged on the sliding frames, and the sliding seats are positioned on two sides of the limiting baffles respectively under the situation that two sliding seats are arranged; positioning devices are installed on the sliding seats to be used for positioning the sliding seats when the sliding seats slide to a position above the locking holes.

10 Claims, 11 Drawing Sheets

(56) References Cited

U.S. PATENT DOCUMENTS

| | | | |
|---|---|---|---|
| 5,884,824 A * | 3/1999 | Spring, Jr. | B60R 9/042 224/325 |
| 5,904,463 A * | 5/1999 | Christensen | B60R 9/00 224/310 |
| 6,092,972 A * | 7/2000 | Levi | B60R 9/0423 224/310 |
| 6,427,888 B1 * | 8/2002 | Condon | B60R 9/042 224/310 |
| 6,428,263 B1 * | 8/2002 | Schellens | B60R 9/042 224/310 |
| 11,938,903 B1 * | 3/2024 | Knapper | B60R 9/042 |
| 11,945,412 B1 * | 4/2024 | Brusselback | B60R 9/10 |
| 2002/0090285 A1 * | 7/2002 | Levi | E06C 5/00 224/310 |
| 2004/0026472 A1 * | 2/2004 | Foo | B60R 9/048 224/310 |
| 2004/0028510 A1 * | 2/2004 | Jones | B60R 9/042 414/462 |
| 2004/0047716 A1 * | 3/2004 | Hendley | B60R 9/0423 224/310 |
| 2006/0102680 A1 * | 5/2006 | Stannard | B60R 9/042 224/924 |
| 2006/0133914 A1 * | 6/2006 | Derks | B60R 9/055 414/462 |
| 2006/0261564 A1 | 11/2006 | Chuang | |
| 2006/0280583 A1 * | 12/2006 | Settelmayer | B60R 9/042 414/462 |
| 2006/0285954 A1 * | 12/2006 | Neary | B60R 9/042 414/465 |
| 2007/0007316 A1 * | 1/2007 | Witczak | B60R 9/042 224/310 |
| 2007/0175936 A1 * | 8/2007 | Goyanko | B60R 9/042 224/309 |
| 2009/0140021 A1 * | 6/2009 | Richter | B60R 9/0423 224/310 |
| 2014/0169918 A1 * | 6/2014 | Buller | B60P 1/486 414/462 |
| 2016/0023613 A1 * | 1/2016 | Pullman | B60R 9/0423 414/800 |
| 2017/0320530 A1 | 11/2017 | Linden et al. | |
| 2020/0180515 A1 * | 6/2020 | Dimmen | A47B 88/45 |
| 2021/0061181 A1 * | 3/2021 | Bica | B60R 16/0207 |
| 2021/0300255 A1 * | 9/2021 | Bouchard | B60P 3/1025 |
| 2022/0355741 A1 * | 11/2022 | Yun | B60R 9/045 |
| 2023/0050631 A1 * | 2/2023 | Wang | B60R 9/045 |
| 2023/0264634 A1 * | 8/2023 | Yun | B60P 1/4414 224/310 |
| 2023/0278654 A1 * | 9/2023 | Ward | B60R 9/042 |
| 2024/0140181 A1 * | 5/2024 | Ye | B60R 9/045 |

\* cited by examiner

LIFTABLE LUGGAGE CARRIER ON CAR ROOF

TECHNICAL FIELD

The present disclosure relates to a luggage carrier, in particular to a liftable luggage carrier on a car roof.

BACKGROUND ART

Due to a fixed structure of an existing luggage carrier on a car roof, a person is required to carry objects to the car roof to fix them, and to carry down luggage from the car roof to take the objects. Since objects are required to be lifted high, if objects are heavy, it is inconvenient to carry the objects, and even the objects cannot be carried by a single person unless two persons cooperate with each other, which is laborious and poor in safety.

SUMMARY

In order to solve the above problems, the present disclosure provides a liftable luggage carrier on a car roof which has lifting and lowering functions, has a moderate height and saves labor when objects are packed in and taken out, and has desirable safety. The specific technical solution is as follows:

a liftable luggage carrier on a car roof includes: sliding frames, where at least two sliding frames are arranged, the sliding frames are fixed on the car roof, and limiting baffles and several locking holes are provided on the sliding frames; sliding seats, where the sliding seats are slidably installed on the sliding frames, one or two sliding seats are arranged on the sliding frames, and the sliding seats are positioned on two sides of the limiting baffles respectively under the situation that two sliding seats are arranged; positioning devices, where the positioning devices are installed on the sliding seats to be used for positioning the sliding seats when the sliding seats slide to a position above the locking holes; connecting-rod devices, where one end of each connecting-rod device is rotatably connected to the corresponding sliding seat and is positioned above the corresponding positioning device; object carrying rods, where one end of each object carrying rod is rotatably connected to the other end of the corresponding connecting-rod device; and fixing lock hooks, where each fixing lock hook is rotatably installed at the other end of the corresponding object carrying rod to be used for being inserted into the corresponding locking hole when the sliding seats abut against the limiting baffles, and the fixing lock hooks lock the object carrying rods. When the sliding seats slide to the position above the locking holes, the object carrying rods are lifted and lowered by means of the connecting-rod devices. When the object carrying rods are lowered to one side of a car, the connecting-rod devices loosen the positioning devices, and the positioning devices are inserted into the locking holes to lock the sliding seats. When the object carrying rods are lifted to the sliding frames, the connecting-rod devices jack up the positioning devices, the positioning devices are separated from the locking holes, and the positioning devices loosen the sliding seats.

By employing the above technical solution, the sliding frames are use for being connected to a car, and the sliding seats drive an object carrying frame to slide from one side of a car roof to a middle of the car roof or to the other side of the car roof, such that objects are positioned above a top of the car, thereby guaranteeing running safety of the car. The connecting-rod devices are used for lowering the object carrying rods from the car roof to a side surface of the car and to a waist position or a position below a waist of a human body such that the objects may be conveniently packed in and taken out, and are not required to be manually carried to the car roof. By means of the connecting-rod devices, the objects may be conveniently lifted to a position above the car roof, use is extremely convenient, labor is saved, safety is high, objects are not likely to fall off, and a car is not likely to be damaged.

Preferably, sliding grooves are provided on the sliding frames, and the sliding seats are slidably inserted into the sliding grooves.

By employing the above technical solution, the sliding grooves may limit a moving direction of the sliding seats, such that use is more convenient.

Further, several sliding wheels are installed at bottoms of the sliding seats, and the sliding wheels are movably inserted into the sliding grooves.

By employing the above technical solution, sliding friction is changed into rolling friction by means of the sliding wheels, and the sliding seats may be pushed and pulled in a more labor-saving manner.

Limiting sliding blocks are arranged on two sides of each object carrying rod, and the limiting sliding blocks are movably inserted into the sliding grooves.

By employing the above technical solution, the limiting blocks limit a sliding shaft in a vertical direction such that the sliding seats may reciprocate in the sliding grooves. Limiting in the vertical direction is realized without other devices, the sliding seats may be limited in the sliding grooves in a running process of a car, the structure is simple, and safety is desirable.

Preferably, the connecting-rod devices include: first connecting rods, where one end of each first connecting rod is rotatably installed on the corresponding sliding seat and is positioned at a top of the corresponding positioning device; second connecting rods, where one end of each second connecting rod is rotatably installed on the corresponding sliding seat and is positioned on one side of the corresponding first connecting rod; third connecting rods, where two ends of each third connecting rod are rotatably connected to the corresponding first connecting rod and the corresponding second connecting rod respectively, and the object carrying rods are fixed on the third connecting rods; and tension devices, where two ends of each tension device are connected to the corresponding first connecting rod and the corresponding second connecting rod respectively, and the tension devices include air tension springs or tension springs.

By employing the above technical solution, the connecting-rod devices realize a four-connecting-rod structure, such that the structure is simple. Buffering and assisting are carried out by means of the tension devices, such that the situation that a large impact force is formed when the object carrying rods are lowered may be prevented. Moreover, assistance is provided when the object carrying rods are lifted such that the objects may be conveniently lifted to a top of a car.

Further, the positioning devices include: first lock hooks, where the first lock hooks are rotatably installed on the sliding seats, and a top of each first lock hook is positioned at one end of the corresponding first connecting rod; first elastic devices, where the first elastic devices are connected to the first lock hooks and the sliding seats respectively to be used for pressing the first lock hooks on the sliding frames; and second lock hooks, where the second lock hooks are rotatably installed on the sliding seats or the first lock hooks and are each positioned on one side of the corresponding first lock hook. The first lock hooks and the second lock hooks are used for being inserted into the locking holes to position the sliding seats, and the first connecting rods are used for loosening and jacking up the first lock hooks.

By employing the above technical solution, the first connecting rods drive the first lock hooks to realize locking and loosening of the first lock hooks and the second lock hooks, the first connecting rods are linked to the first lock hooks, an independent unlocking mechanism is not required, the structure is compact, and use is convenient.

Further, the second lock hooks are rotatably installed on the first lock hooks. The first elastic devices include first springs or first torsion springs, two ends of each first spring are connected to the corresponding first lock hook and the corresponding second lock hook respectively to be used for pressing the first lock hooks and the second lock hooks on the sliding frames, and two ends of each first torsion spring are connected to the corresponding first lock hook and the corresponding second lock hook respectively to be used for pressing the first lock hooks and the second lock hooks on the sliding frames.

Preferably, the liftable luggage carrier on a car roof further includes second springs or second torsion springs, two ends of each second spring are connected to the corresponding object carrying rod and the corresponding fixing lock hook respectively, and two ends of each second torsion spring are connected to the corresponding object carrying rod and the corresponding fixing lock hook respectively.

By employing the above technical solution, the second springs or the second torsion springs provide an elastic force, so as to keep the fixing lock hooks pressed on the locking holes.

Preferably, the liftable luggage carrier on a car roof further includes auxiliary wheels, and the auxiliary wheels are fixed at ends of the sliding frames and are positioned below the object carrying rods.

By employing the above technical solution, the auxiliary wheels reduce a friction force, and use is convenient.

Preferably, the liftable luggage carrier on a car roof further includes a connecting pull rod, and two ends of the connecting pull rod are connected to two adjacent fixing lock hooks or object carrying rods respectively.

Compared with that prior art, the present disclosure has the following beneficial effects:

according to the liftable luggage carrier on a car roof provided in the present disclosure, the object carrying rods are slidably moved, and are lifted and lowered by means of the connecting-rod devices, and the lowered object carrying rods have a moderate height such that objects may be packed in and taken out by a single person in a labor-saving manner, safety is high, and use is convenient.

DETAILED DESCRIPTION OF THE EMBODIMENTS

Figure 1:
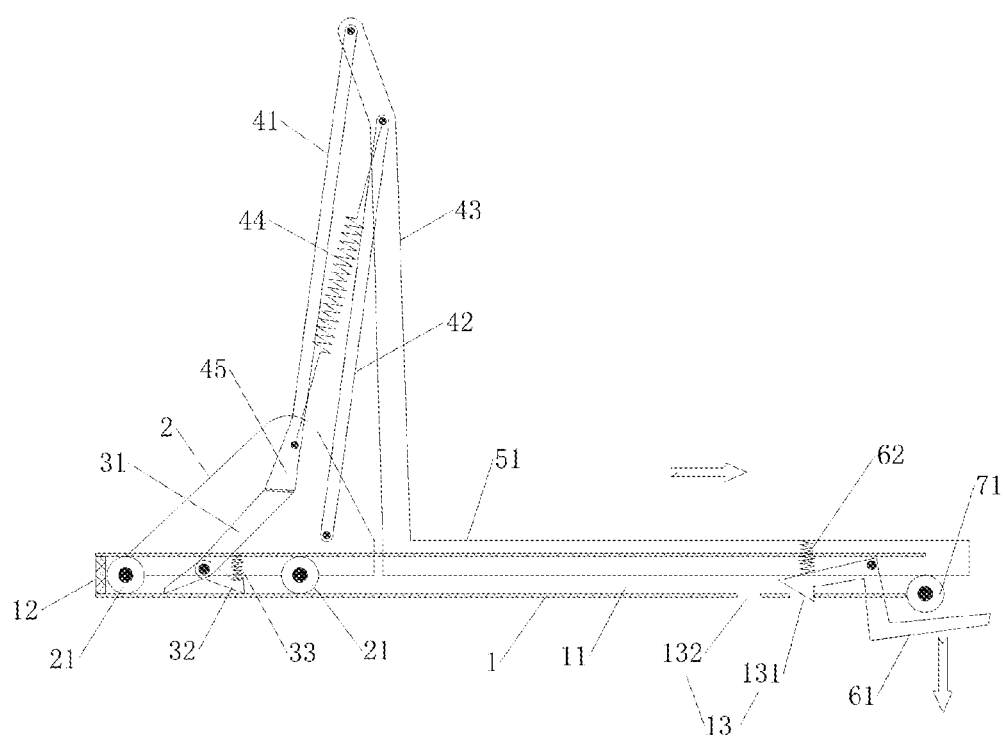
FIG. 1 is a schematic diagram of a liftable luggage carrier on a car roof in a retracted state.
Figure 2:
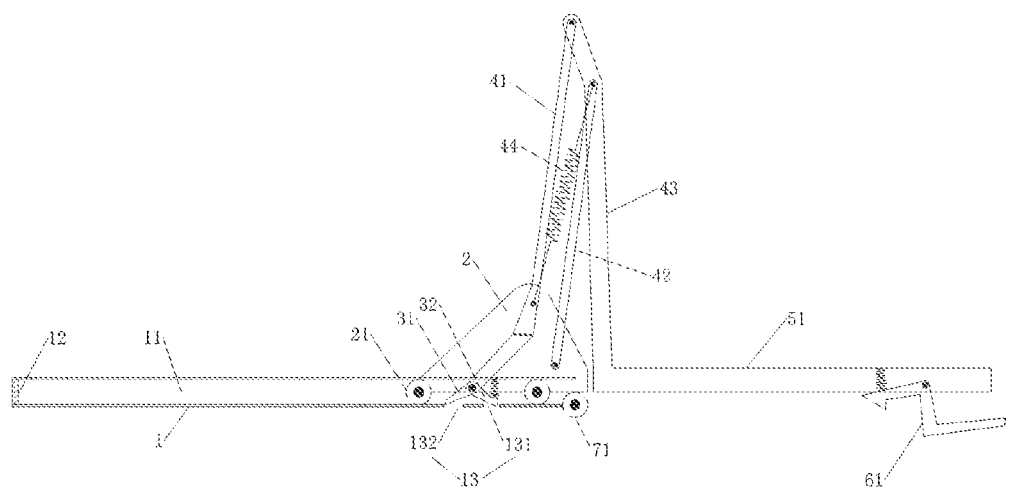
FIG. 2 is a schematic diagram of a liftable luggage carrier on a car roof in a state ready to be lifted and lowered.
Figure 3:
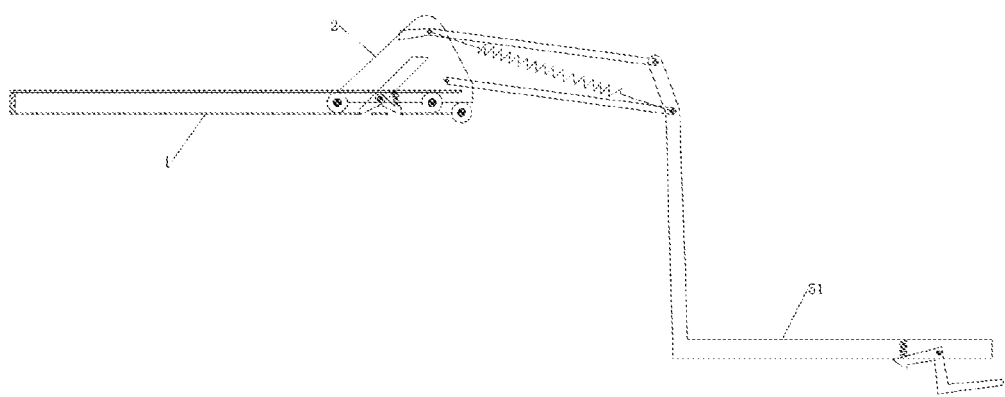
FIG. 3 is a schematic diagram of a liftable luggage carrier on a car roof in a lowering state.
Figure 4:
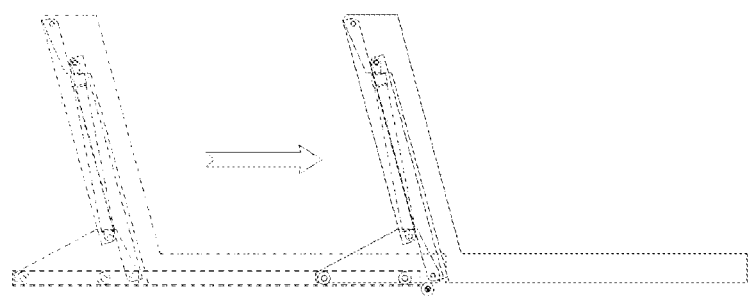
FIG. 4 is a schematic diagram of an object carrying rod from a moving position to a lifting and lowering position.
Figure 5:
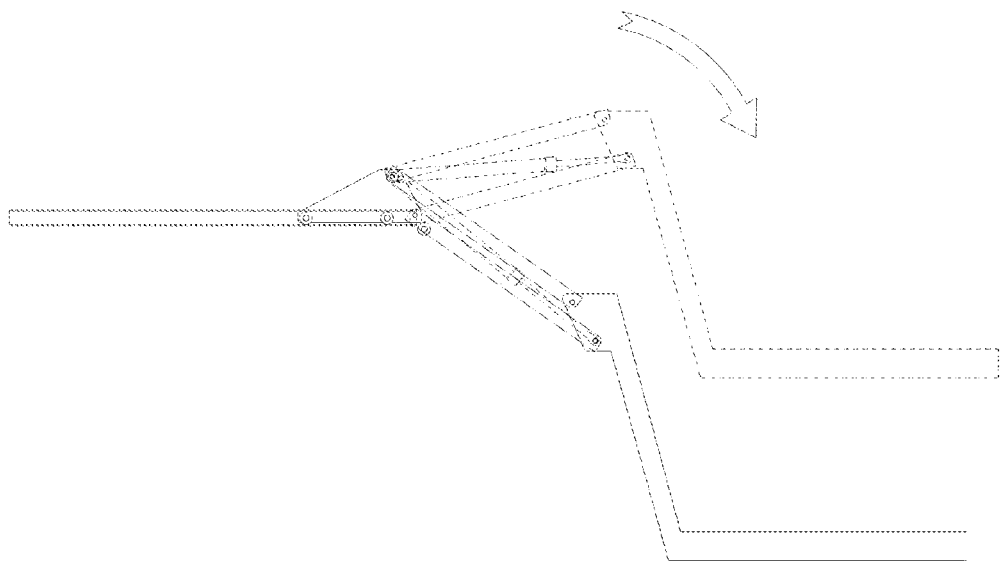
FIG. 5 is a schematic diagram of lifting and lowering an object carrying rod.
Figure 6:
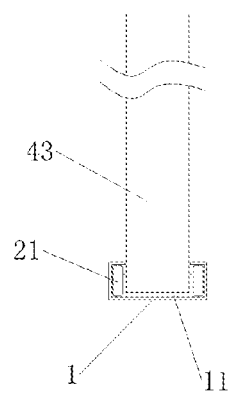
FIG. 6 is a side view of a liftable luggage carrier on a car roof.
Figure 7:
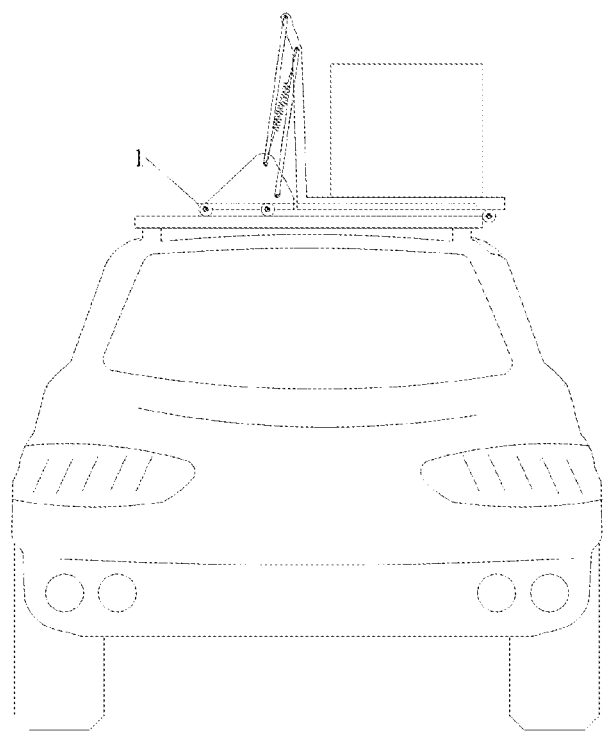
FIG. 7 is a state diagram of a liftable luggage carrier on a car roof fixing objects on a car.
Figure 8:
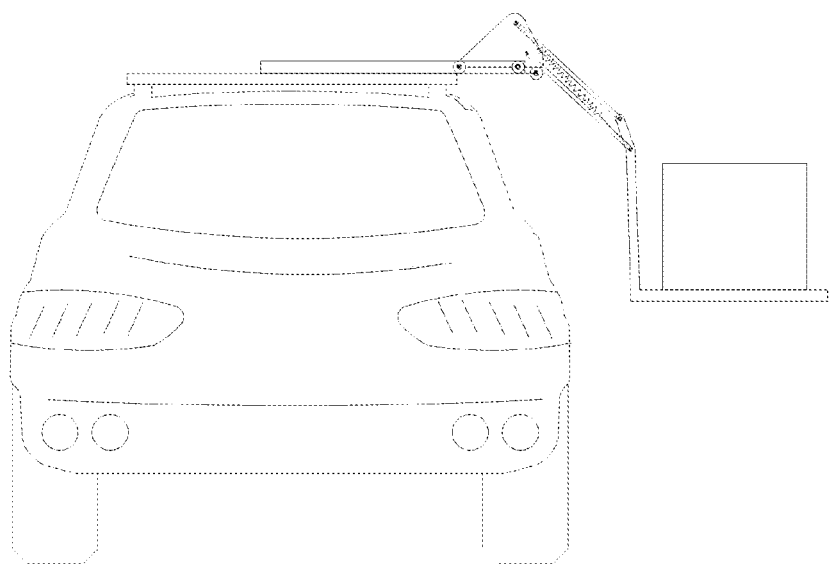
FIG. 8 is a state diagram of a liftable luggage carrier on a car roof in a lowering state for packing in and taking out objects on a car.
Figure 9:
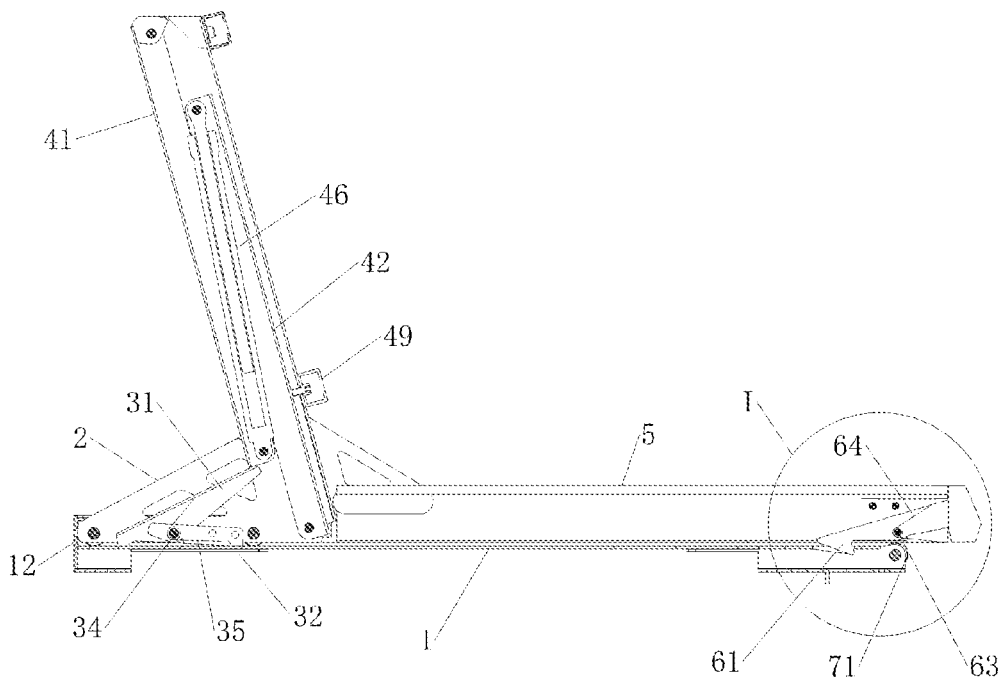
FIG. 9 is a sectional view of an embodiment.
Figure 10:
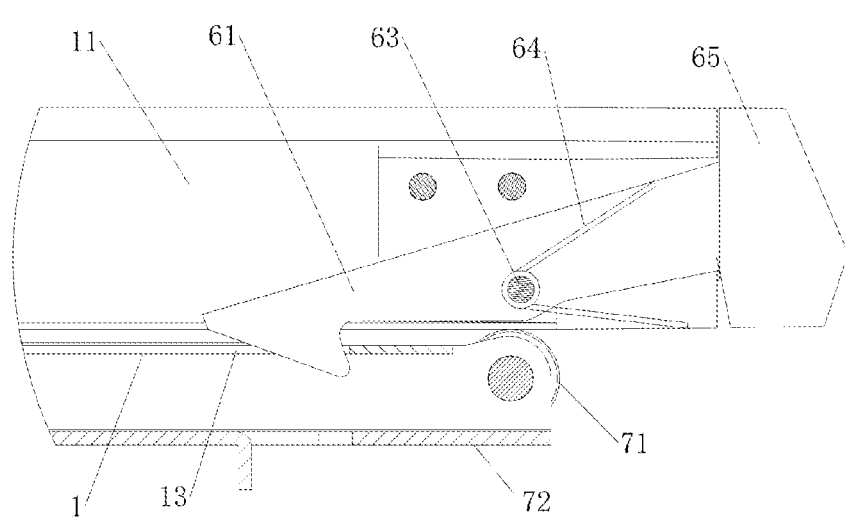
FIG. 10 is a partial enlarged view of a position I in FIG. 9.
Figure 11:
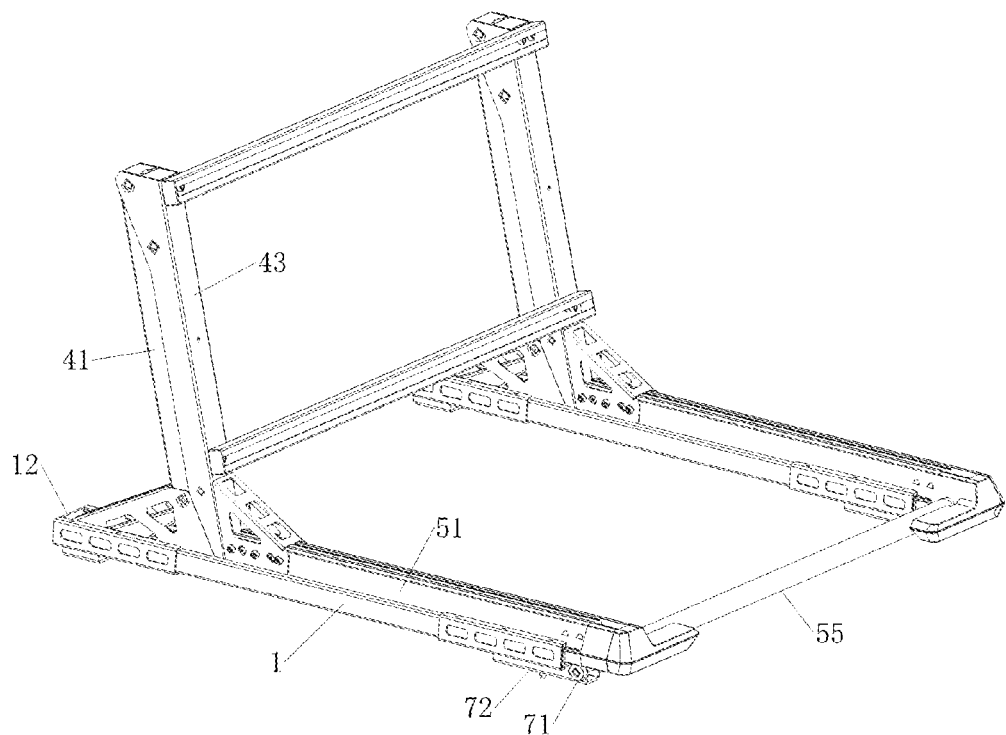
FIG. 11 is a schematic structural diagram of an embodiment.
Figure 12:
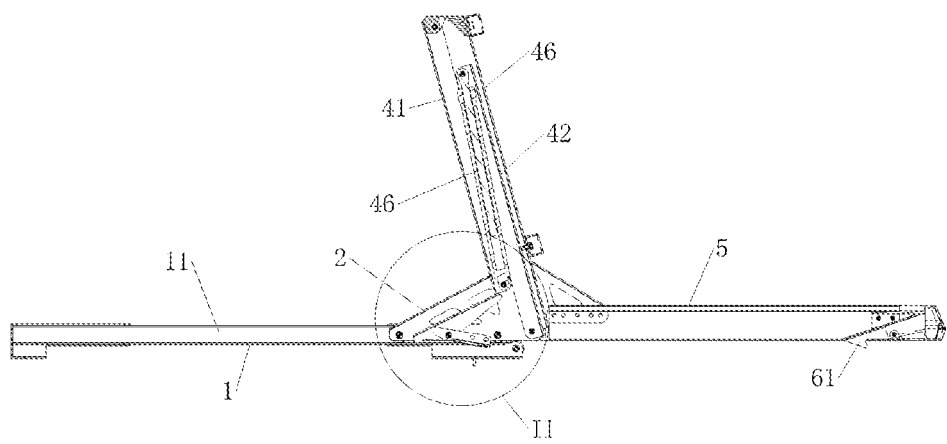
FIG. 12 is a sectional view of an embodiment in a state ready to be lifted and lowered.
Figure 13:
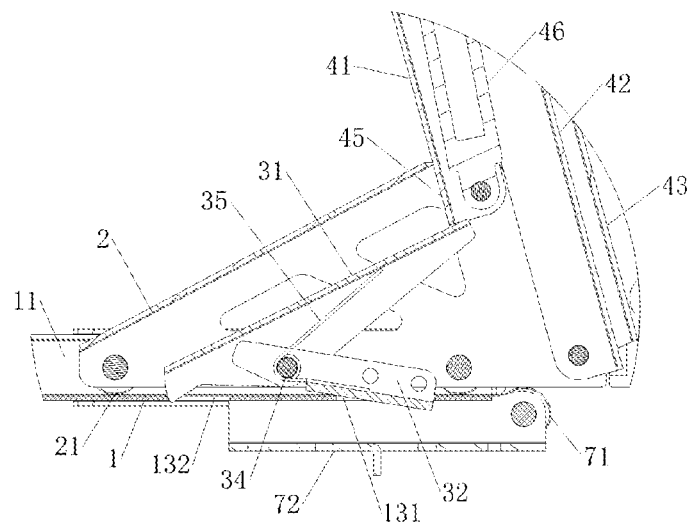
FIG. 13 is a partial enlarged view of a position II in FIG. 12.
Figure 14:
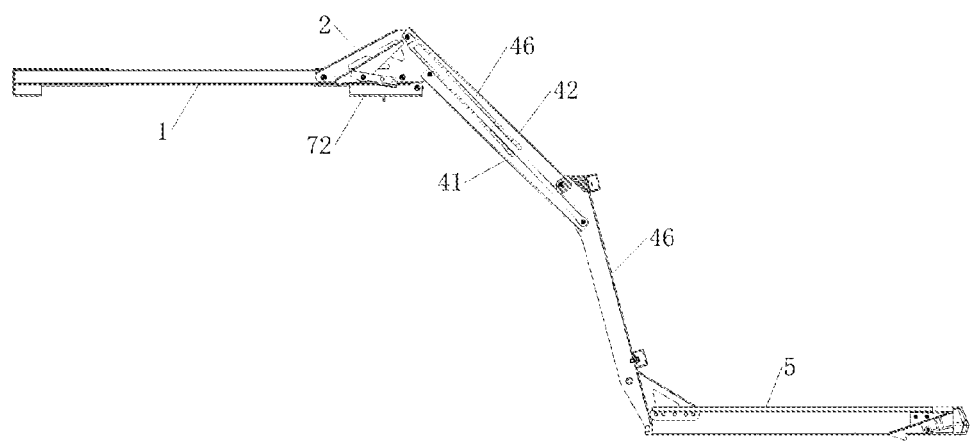
FIG. 14 is a sectional view of an embodiment in a lowering state.
Figure 15:
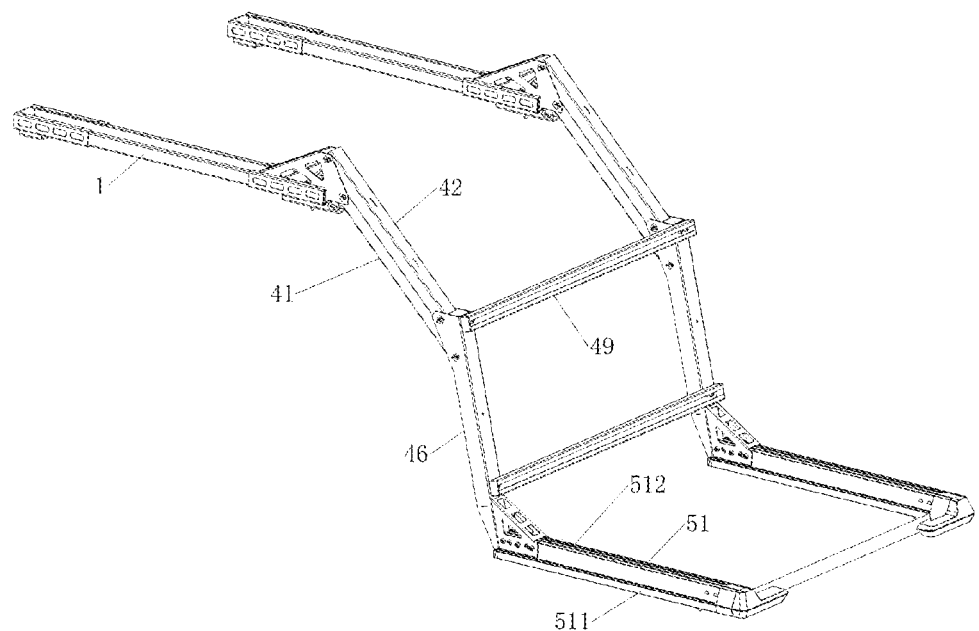
FIG. 15 is a schematic structural diagram of an embodiment in a lowering state.
Figure 16:
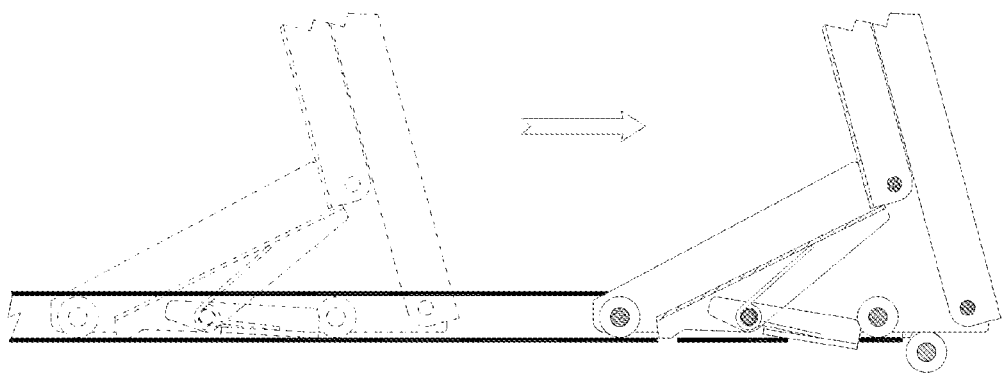
FIG. 16 is a schematic diagram of a sliding seat sliding to a position above a locking hole.
Figure 17:
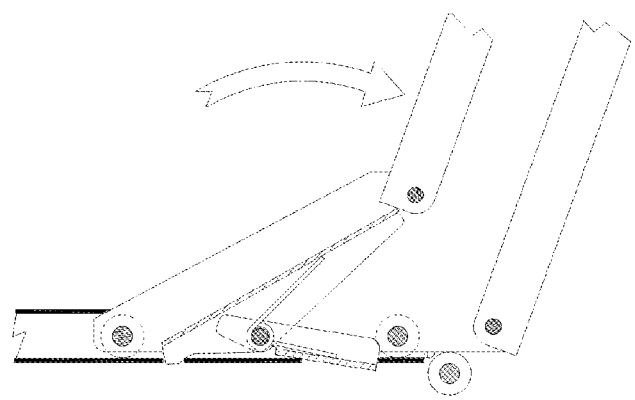
FIG. 17 is a schematic diagram of a connecting-rod device loosening a positioning device.
Figure 18:
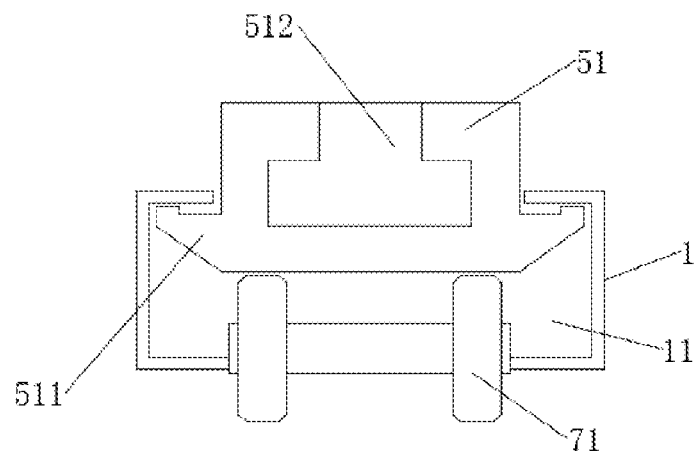
FIG. 18 is a schematic diagram of an object carrying rod inserted into a sliding groove.

The present disclosure will be further described below in combination with the accompanying drawings.

Embodiment 1

As shown in FIGS. 1 to 18, a liftable luggage carrier on a car roof includes sliding frames 1, sliding seats 2, positioning devices, connecting-rod devices, object carrying rods 51, fixing lock hooks 61, auxiliary wheels 71 and second torsion springs 64. The sliding frames 1, the sliding seats 2, the positioning devices, the connecting-rod devices, the fixing lock hooks 61, the auxiliary wheels 71 and the second torsion springs 64 are same in number.

Two sliding frames 1 are symmetrically arranged and fixed on a car roof. Sliding grooves 11 are provided on the sliding frames 1, a cross section of each sliding groove 11 is right-angled U-shaped, a limiting baffle 12 is arranged at one end of each sliding groove 11, a locking hole 13 is provided on the other end thereof, and the locking holes 13 include first locking holes 131 and second locking holes 132.

Sliding wheels 21 are symmetrically arranged on two sides of each sliding seat 2, at least two sliding wheels 21 are arranged on each side, and the sliding wheels 21 are movably inserted into two sides of each sliding groove 11. The sliding seats 2 may be conveniently pushed and pulled by means of the sliding wheels 21, so as to change sliding friction into rolling friction.

Limiting sliding blocks 511 are symmetrically arranged on two sides of each object carrying rod 51, each object carrying rod 511 is inverted T-shaped, the object carrying rods 51 are movably inserted into the sliding grooves 11, the limiting sliding blocks 511 cooperate with the sliding grooves 11 to limit upper and lower positions and left and right positions of the object carrying rods 51, and the object carrying rods 51 are fixed in the sliding grooves 11. Two object carrying rods 51 are symmetrically arranged. Fixing grooves 512 are provided on tops of the object carrying rods 51, each fixing groove 512 is T-shaped, flat plates or connecting rods for carrying objects may be installed in the fixing grooves 512 by means of nuts and screws, or objects may be directly fixed in the fixing grooves 512 by means of connecting devices.

The connecting-rod devices and the sliding frames 1 are same in number, and the connecting-rod devices include first connecting rods 41, second connecting rods 42, third connecting rods 43 and air tension springs 46. One end of each first connecting rod 41 is rotatably installed on the corresponding sliding seat 2 and is provided with a jacking rod 45, and the other end thereof is rotatably connected to one end of the corresponding third connecting rod 43. Each second connecting rod 42 is arranged on one side of the corresponding first connecting rod 41 in a parallel manner, one end of each second connecting rod 42 is rotatably installed on the corresponding sliding seat 2, and the other end thereof is rotatably installed on one end of the corresponding third connecting rod 43. The other end of each third connecting rod 43 is fixed to one end of the corresponding object carrying rod 51. The sliding seats 2, the first connecting rods 41, the second connecting rods 42 and the third connecting rods 43 form four-connecting-rod mechanisms. Two ends of each air tension spring 46 are connected to one end of the corresponding first connecting rod 41 and the other end of the corresponding second connecting rod 42 respectively, that is, each air tension spring 46 is connected to two opposite corners of the corresponding four-connecting-rod mechanism to provide a pulling force when the four-connecting-rod is unfolded and retracted. The third connecting rods 43 are made of plates, and a cross section is U-shaped such that the first connecting rods 41 and the second connecting rods 42 may be accommodated inside, thereby reducing volume occupied by the four-connecting-rod mechanisms. Reinforcing connecting rods 49 are installed on the two third connecting rods 43, two reinforcing connecting rods 49 are arranged, and two ends of each reinforcing connecting rod 49 are connected to the two third connecting rods 43 respectively to be used for forming an integrated structure to improve strength. When the object carrying rods 51 are in a folded state, the four-connecting-rod are retracted, and the air tension springs 46 tension the first connecting rods 41 and the second connecting rods 42 to close the first connecting rods and the second connecting rods. Since two ends of each air tension spring 46 are positioned on two sides of a diagonal line of the corresponding four-connecting-rod respectively, the air tension springs 46 play a role of locking the first connecting rods 41 and the second connecting rods 42 and keeping this closed state. When the object carrying rods 51 are in an unfolded state, the air tension springs 46 tension the first connecting rods 41 and the second connecting rods 42, and the first connecting rods 41 and the second connecting rods 42 are also in the closed state. Since two ends of each air tension spring 46 are positioned on two sides of a diagonal line of the corresponding four-connecting-rod respectively, the air tension springs 46 play a role of locking the first connecting rods 41 and the second connecting rods 42 and keeping this closed state. Since the first connecting rods 41 and the second connecting rods 42 are closed, the corresponding four-connecting-rod mechanism may not be continuously turned downwards, and the air tension springs 46 keep the four-connecting-rod mechanisms in a current state, and the four-connecting-rod mechanisms neither are retracted upwards nor move downwards, such that a height of the object carrying rods 51 is fixed, and objects may be conveniently packed in and taken out.

The positioning devices include first lock hooks 31, first torsion springs 35 and second lock hooks 32. The first lock hooks 31 are rotatably installed on the sliding seats 2 by means of first rotary shafts 34, tops of the first lock hooks 31 are positioned below jacking rods 45, and bottoms of the first lock hooks 31 are slidably pressed under bottoms of the sliding grooves 11. One end of each second lock hook 32 is rotatably installed on the corresponding first rotary shaft 34, and the other end of each second lock hook 32 is slidably positioned at the bottom of the corresponding sliding groove 11. Each first lock hook 31 and the corresponding second lock hook 32 are "herringbone". The first torsion springs 35 are movably inserted into the first rotary shafts 34, one end of each first torsion spring 35 is connected to the corresponding first lock hook 31, and the other end thereof is connected to the corresponding second lock hook 32, so as to movably press the first lock hooks 31 and the second lock hooks 32 at the bottoms of the sliding grooves 11. One locking hole 13 may be provided, and the first lock hooks 31 and the second lock hooks 32 are inserted into two sides of the locking hole 13 respectively.

Each fixing lock hook 61 is rotatably installed on the other end of the corresponding object carrying rod 51 by means of a fixing shaft 63, second torsion springs 64 are installed on the fixing shafts 63, one end of each second torsion spring 64 is connected to the corresponding object carrying rod 51, and the other end thereof is connected to the corresponding fixing lock hook 61 to be used for pressing the fixing lock hooks 61 to the bottoms of the sliding grooves 11. When abutting against the limiting baffles 12, the sliding seats 2 are inserted into the first locking holes 131 to lock the object carrying rods 51. Tails of the fixing lock hooks 61 are fixed on unlocking press plates 65, when the unlocking press plates 65 are pressed downwards, the fixing lock hooks 61 are separated from the locking holes 13 to realize unlocking. In a free state, the second torsion springs 64 enable the fixing lock hooks 61 to press the first lock holes 131.

Two ends of the connecting pull rod 55 are connected to the object carrying rods 51 respectively to be used for pulling the object carrying rods 51. The two object carrying rods 51 may be pulled by pulling the connecting pull rod 55, such that use is convenient, and connection strength between the adjacent object carrying rods 51 may be improved.

The auxiliary wheels 71 are rotatably installed on auxiliary frames 72, and each auxiliary frame 72 is fixed at a bottom of the other end of the corresponding sliding frame 1 to be used for supporting the sliding seats 2 and the object carrying rods 51.

As shown in FIGS. 7 to 18, when objects are placed, the connecting pull rod 55 is pressed downwards, the connecting pull rod 55 enables the fixing lock hooks 61 at two ends to be turned upwards, the fixing lock hooks 61 are separated from the first locking holes 131, then the connecting pull rod 55 is pulled outwards, the object carrying rods 51 and the sliding seats 2 slide towards one side of a car, and the first lock hooks 31 and the second lock hooks 32 slide in the sliding grooves 11. When each sliding seat 2 moves to the other end of the corresponding sliding groove 11, the second lock hooks 32 are inserted into the first locking holes 131, and the sliding seats 2 may not continuously slide to the outside of the car. The connecting pull rod 55 is continuously pulled, when a pulling force is greater than a pulling force of the air tension springs 46, the object carrying rods 51 drive the third connecting rods 43 to move outwards and be lowered at the same time, and the object carrying rods 51 move downwards to one side of the car by means of the four-connecting-rod mechanisms and are positioned at a waist position of a human body. The object carrying rods 51 are always kept in a horizontal state in a lowering process, and the air tension springs 46 provide a pulling force, such that the object carrying rods 51 are always supported by an upward force when lowered. Thus, the object carrying rods 51 are prevented from freely falling, and safety and reliability are improved. When the object carrying rods 51 are lowered, the jacking rods 45 of the first connecting rods 41 are gradually separated from the tops of the first lock hooks 31 when rotating, and the first lock hooks 31 are inserted into the second locking holes 132 under the action of the first torsion springs 35, so as to lock the sliding seats 2, and the sliding seats 2 may not move along the sliding grooves 11. After objects are fixed on the object carrying rods 51, the object carrying rods 51 are pushed upwards, and the object carrying rods 51 move upwards by means of the air tension springs 46 and pushing of a person until each object carrying rod 51 is positioned at one end of the corresponding sliding frame 1. The jacking rods 45 press the tops of the first lock hooks 31 again, the first lock hooks 31 are jacked up, and the first lock hooks 31 are separated from the second locking holes 132. Then the object carrying rods 51 are pushed towards the limiting baffles 12, the second lock hooks 32 are separated from the first locking holes 131, and the second lock hooks 32 slide at the bottoms of the sliding grooves 11 until ends of the sliding seats 2 abut against the limiting baffles 12. In this way, the fixing lock hooks 61 move to a position right above the first locking holes 131, the fixing lock hooks 61 are inserted into the first locking holes 131 under the action of the second torsion springs 64, and the object carrying rods 51 and the sliding seats 2 are fixed on the sliding frames 1.

When the objects and the object carrying rods 51 are turned to a top of a car, the air tension springs 46 provide a pulling force to reduce an upward pushing force such that a single person may easily carry the objects to the top of the car. A damping effect is achieved when the objects and the object carrying rods 51 are lowered, such that a lowering speed of the objects and the object carrying rods 51 is reduced, a desirable buffering effect is achieved, and safety is high.

Embodiment 2

The two fixing lock hooks 61 are connected by means of the connecting pull rod 55. When the connecting pull rod 55 is pulled, the object carrying rods 51 may be driven to slide, and unlocking may be realized at the same time, such that use is convenient.

Embodiment 3

Figure 19:
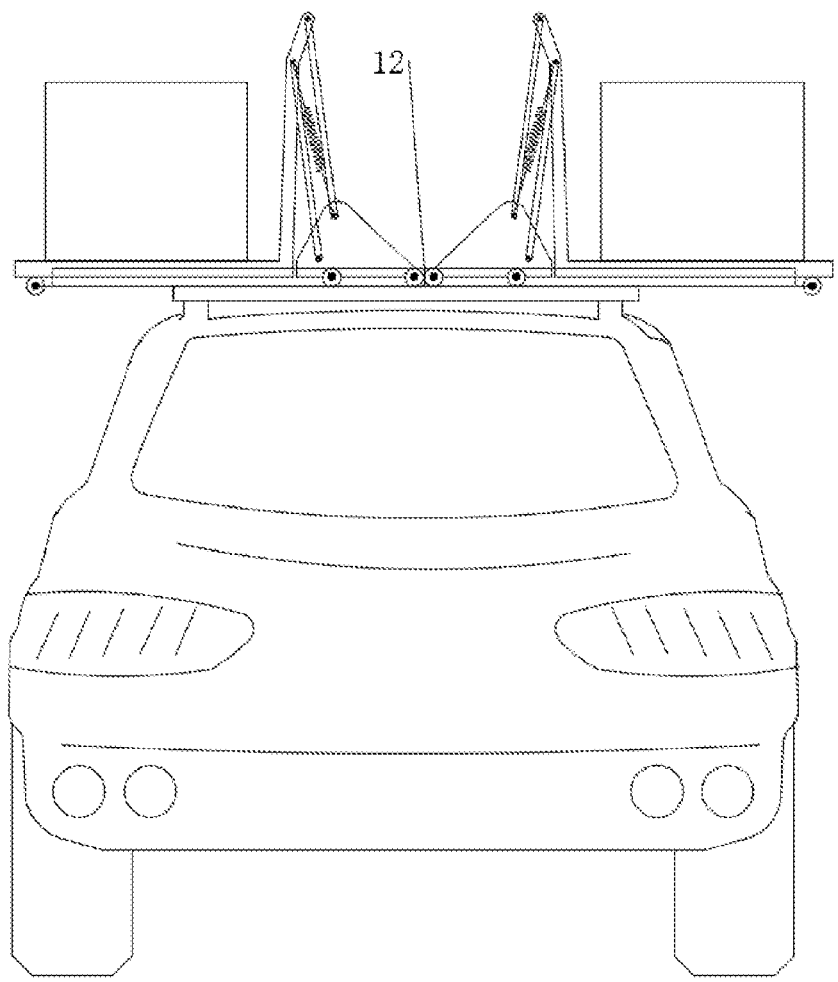
FIG. 19 is a schematic diagram of a car roof provided with two liftable luggage carriers.

As shown in FIG. 19, the limiting baffles 12 are arranged at centers of the sliding grooves 11, the locking holes 13 are provided at two ends of each sliding groove 11, two sliding seats 2 are arranged and positioned on two sides of the limiting baffles 12 respectively to form two liftable luggage carriers, and the two luggage carriers are positioned on two sides of a top of a car respectively. The two sliding seats 2 share one sliding frame 1. By means of the two liftable luggage carriers, objects may be conveniently packed in and taken out from two sides of the car, and more objects may be carried.

Figure 20:
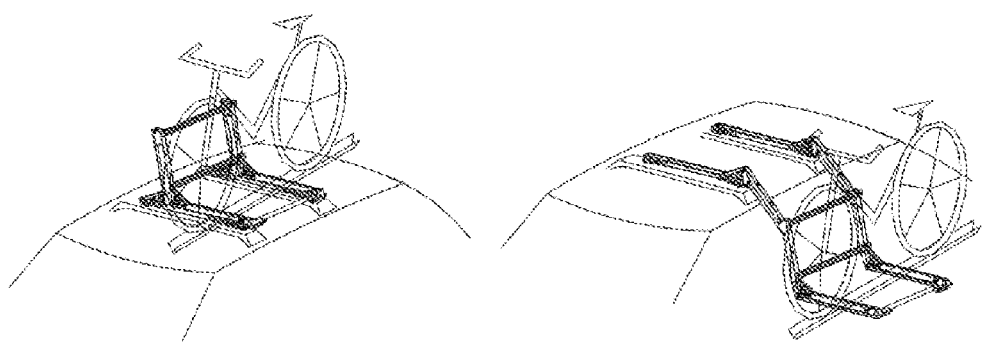
FIG. 20 is a diagram of a usage scenario of lifting and lowering a bicycle.
Figure 21:
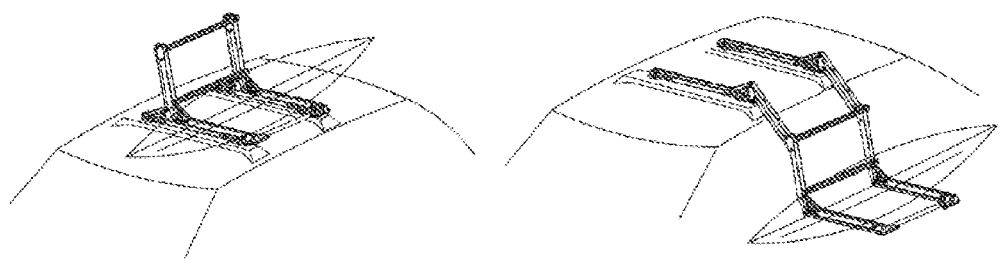
FIG. 21 is a diagram of a usage scenario of lifting and lowering a rubber boat.
Figure 22:
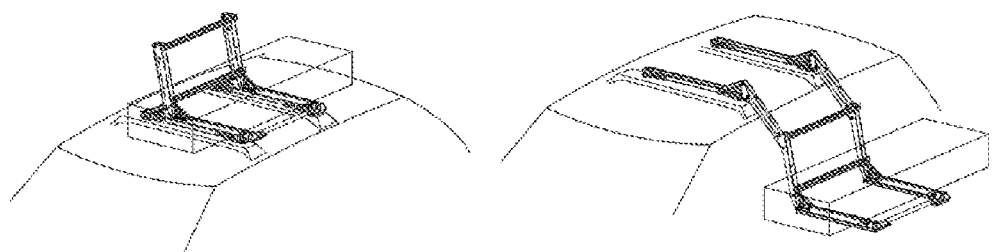
FIG. 22 is a diagram of a usage scenario of lifting and lowering luggage.

FIG. 20 to FIG. 22 are schematic diagrams of installing a bicycle, a rubber boat and luggage respectively.

The technical principle of the present disclosure is described above in combination with specific embodiments. This description is only for the purpose of illustrating the principle of the present disclosure and is not to be construed in any way as limiting the protection scope of the present disclosure. On the basis of explanations herein, those skilled in the art can devise other specific implementations of the present disclosure without inventive efforts, which fall within the protection scope of the claims of the present disclosure.

The invention claimed is:

1. A liftable luggage carrier on a car roof, comprising:
sliding frames (1), wherein at least two sliding frames (1) are arranged, the sliding frames (1) are fixed on the car roof, and limiting baffles (12) and several locking holes (13) are provided on the sliding frames (1);
sliding seats (2), wherein the sliding seats (2) are slidably installed on the sliding frames (1), one or two sliding seats (2) are arranged on the sliding frames (1), and the sliding seats (2) are positioned on two sides of the limiting baffles (12) respectively under the situation that two sliding seats are arranged;
positioning devices, wherein the positioning devices are installed on the sliding seats (2) to be used for positioning the sliding seats (2) when the sliding seats (2) slide to a position above the locking holes (13);
connecting-rod devices, wherein one end of each connecting-rod device is rotatably connected to the corresponding sliding seat (2) and is positioned above the corresponding positioning device;
object carrying rods (51), wherein one end of each object carrying rod (51) is rotatably connected to the other end of the corresponding connecting-rod device; and
fixing lock hooks (61), wherein each fixing lock hook (61) is rotatably installed at the other end of the corresponding object carrying rod (51) to be used for being inserted into the corresponding locking hole (13) when the sliding seats (2) abut against the limiting baffles (12), and the fixing lock hooks (61) lock the object carrying rods (51); wherein
when the sliding seats (2) slide to the position above the locking holes (13), the object carrying rods (51) are lifted and lowered by means of the connecting-rod devices; when the object carrying rods (51) are lowered to one side of a car, the connecting-rod devices loosen the positioning device, and the positioning devices are inserted into the locking holes (13) to lock the sliding seats (2); and when the object carrying rods (51) are lifted to the sliding frames (1), the connecting-rod devices jack up the positioning devices, the positioning devices are separated from the locking holes (13), and the positioning devices loosen the sliding seats (2).

2. The liftable luggage carrier on a car roof according to claim 1, wherein sliding grooves (11) are provided on the sliding frames (1), and the sliding seats (2) are slidably inserted into the sliding grooves (11).

3. The liftable luggage carrier on a car roof according to claim 2, wherein several sliding wheels (21) are installed at bottoms of the sliding seats (2), and the sliding wheels (21) are movably inserted into the sliding grooves (11).

4. The liftable luggage carrier on a car roof according to claim 2, wherein limiting sliding blocks (511) are arranged on two sides of each object carrying rod (51), and the limiting sliding blocks (511) are movably inserted into the sliding grooves (11).

5. The liftable luggage carrier on a car roof according to claim 1, wherein the connecting-rod devices comprise:
   first connecting rods (41), wherein one end of each first connecting rod (41) is rotatably installed on the corresponding sliding seat (2) and is positioned at a top of the corresponding positioning device;
   second connecting rods (42), wherein one end of each second connecting rod (42) is rotatably installed on the corresponding sliding seat (2) and is positioned on one side of the corresponding first connecting rod (41);
   third connecting rods (43), wherein two ends of each third connecting rod (43) are rotatably connected to the corresponding first connecting rod (41) and the corresponding second connecting rod (42) respectively, and the object carrying rods (51) are fixed on the third connecting rods (43); and
   tension devices, wherein two ends of each tension device are connected to the corresponding first connecting rod (41) and the corresponding second connecting rod (42) respectively, and the tension devices comprise air tension springs (46) or tension springs (44).

6. The liftable luggage carrier on a car roof according to claim 5, wherein the positioning devices comprise:
   first lock hooks (31), wherein the first lock hooks (31) are rotatably installed on the sliding seats (2), and a top of each first lock hook (31) is positioned at one end of the corresponding first connecting rod (41);
   first elastic devices, wherein the first elastic devices are connected to the first lock hooks (31) and the sliding seats (2) respectively to be used for pressing the first lock hooks (31) on the sliding frames (1); and
   second lock hooks (32), wherein the second lock hooks (32) are rotatably installed on the sliding seats (2) or the first lock hooks (31) and are each positioned on one side of the corresponding first lock hook (31); wherein the first lock hooks (31) and the second lock hooks (32) are used for being inserted into the locking holes (13) to position the sliding seats (2), and the first connecting rods (41) are used for loosening and jacking up the first lock hooks (31).

7. The liftable luggage carrier on a car roof according to claim 6, wherein the second lock hooks (32) are rotatably installed on the first lock hooks (31), the first elastic devices comprise first springs (33) or first torsion springs (35), two ends of each first spring (33) are connected to the corresponding first lock hook (31) and the corresponding second lock hook (32) respectively to be used for pressing the first lock hooks (31) and the second lock hooks (32) on the sliding frames (1), and two ends of each first torsion spring (35) are connected to the corresponding first lock hook (31) and the corresponding second lock hook (32) respectively to be used for pressing the first lock hooks (31) and the second lock hooks (32) on the sliding frames (1).

8. The liftable luggage carrier on a car roof according to claim 1, further comprising second springs (62) or second torsion springs (64), wherein two ends of each second spring (62) are connected to the corresponding object carrying rod (51) and the corresponding fixing lock hook (61) respectively, and two ends of each second torsion spring (64) are connected to the corresponding object carrying rod (51) and the corresponding fixing lock hook (61) respectively.

9. The liftable luggage carrier on a car roof according to claim 1, further comprising auxiliary wheels (71), wherein the auxiliary wheels (71) are fixed at ends of the sliding frames (1) and are positioned below the object carrying rods (51).

10. The liftable luggage carrier on a car roof according to claim 1, further comprising a connecting pull rod (55), wherein two ends of the connecting pull rod (55) are connected to two adjacent fixing lock hooks (61) or object carrying rods (51) respectively.

* * * * *